(12) United States Patent
Sabatino et al.

(10) Patent No.: US 6,512,976 B1
(45) Date of Patent: Jan. 28, 2003

(54) METHOD AND SYSTEM FOR TERRAIN AIDED NAVIGATION

(75) Inventors: Anthony E. Sabatino, Albuquerque, NM (US); Leroy G. Romero, Albuquerque, NM (US); Michael D. Pyne, Rio Rancho, NM (US); Steven D. Martinez, Corrales, NM (US); Paul A. Cox, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/844,912

(22) Filed: Apr. 27, 2001

(51) Int. Cl.[7] ................................................ G01C 21/26
(52) U.S. Cl. .................. 701/207; 701/200; 342/357.02; 342/46
(58) Field of Search ................................. 701/200, 207, 701/208, 213; 342/456, 357.02, 357.08, 357.01, 26, 29, 179, 63, 64, 46, 42, 43; 702/94; 340/961, 963, 968, 970

(56) References Cited

U.S. PATENT DOCUMENTS

| | | | | |
|---|---|---|---|---|
| 3,940,597 A | * | 2/1976 | DiMatteo | 342/456 |
| 4,829,304 A | * | 5/1989 | Baird | 342/63 |
| 5,331,562 A | * | 7/1994 | McGuffin | 342/63 |
| 5,335,181 A | * | 8/1994 | McGuffin | 342/64 |
| 5,574,649 A | | 11/1996 | Levy | 364/449 |
| 5,928,309 A | | 7/1999 | Korver et al. | 701/214 |
| 5,936,552 A | * | 8/1999 | Wichgers et al. | 340/961 |
| 5,952,961 A | * | 9/1999 | Denninger | 342/357.02 |
| 6,014,103 A | | 1/2000 | Sumner et al. | 342/457 |
| 6,167,347 A | | 12/2000 | Lin | 701/214 |
| 6,182,007 B1 | | 1/2001 | Szczerba | 701/202 |
| 6,218,980 B1 | | 4/2001 | Goebel et al. | 342/64 |
| 6,331,835 B1 | * | 12/2001 | Gustafson et al. | 342/357.01 |

\* cited by examiner

*Primary Examiner*—Jacques H. Louis-Jacques

(57) ABSTRACT

A method and system for terrain aided navigation which provide more precise and more accurate position, velocity, altitude, and attitude for an air vehicle. The present method is a continuous, active, all-weather, day/night, self-contained vehicle system used for terminal and en route navigation. The present method utilizes on-vehicle sensing elements which require no external stimulation, eliminating dependence on external ground and space-based navigation aides. The present method also provides a drift-free solution. The present method is more difficult to detect (sense) and more difficult to disrupt.

37 Claims, 4 Drawing Sheets

METHOD AND SYSTEM FOR TERRAIN AIDED NAVIGATION

BACKGROUND OF THE INVENTION

1. Field of the Invention (Technical Field)

The invention relates to avionics navigation aids and more specifically to an onboard navigational system.

2. Background Art

The present state of the art includes navigation systems using Global Positioning System (GPS) sensors that are dependent upon receiving information from the GPS satellite constellation. GPS sensors may receive inaccurate or no data due to jamming, masking, spoofing, and other problems that communication systems are susceptible to. Other errors and/or dependencies are inherent to terrestrial-based and other navigation systems, and these errors can be reduced or eliminated using the present invention. Also, there is a need to reduce cost, reduce weight, and to have a system with a low probability of detection.

Some prior art systems include GPS-aided navigation systems, such as U.S. Pat. No. 6,167,347 entitled Vehicle Positioning Method And System Thereof, and U.S. Pat. No. 5,928,309 entitled Navigation/Guidance System For A Land-Based Vehicle.

A related invention is U.S. Pat. No. 6,218,980 entitled Terrain Correlation System. The present invention differs from U.S. Pat. No. 6,218,980 in that the present invention detects the highest elevation in given area sensed by the RADAR sensor, then compares the highest elevation sensed to those in a stored terrain data base; whereas U.S. Pat. No. 6,218,980 forms a terrain map of a given area illuminated and sensed by its RADAR, then compares the sensed terrain map to stored terrain maps. Other related patents are U.S. Pat. No. 6,014,103 entitled Passive Navigation System, and U.S. Pat. No. 5,574,649 entitled Position-Locating Method And Apparatus including corrections for elevational changes.

Also, cruise missiles have systems that updates the onboard navigation solution by correlating onboard, digitized terrain photos to photos taken in flight with an onboard camera, and by using GPS information. Present systems do not automatically and continuously compute a navigation solution using a RADAR sensor with terrain comparator. They integrate information from other sensors including cameras, RADAR, and GPS, and by using other methods like differential GPS.

Reliance on external communication systems and communication links including GPS and other space-based navigation systems, and terrestrial-based navigation systems, result in a higher probability of detection due to emissions from onboard sensors. Terrestrial-based systems are susceptible to data integrity issues and loss of communications. Systems using photographic sensors require adequate illumination of the terrain and are impaired by optical obstructions like dust, smoke, and clouds, and are easily detected and are very costly. Systems using terrain mapping sensors like terrain mapping RADAR are easily detected and very costly. These navigation solutions in state of the art systems are not autonomous and do not continuously compute improved solutions. These systems typically use strobe lights, satellites, space-based and ground-based transmitters, which are easily detected.

Although these prior art systems update the navigation solution, they are aperiodic and/or not continuous. For example, a GPS-aided navigation system typically updates its navigation solution once per second.

SUMMARY OF THE INVENTION (DISCLOSURE OF THE INVENTION)

The novel feature of the present invention is the use of terrain features in all weather conditions for preparing a navigation solution. Terrain feature sensing and comparison with known terrain features has typically been applied for purposes of recognition, not for aiding a navigation solution. The present invention improves the precision and accuracy of other navigation solutions by automatically and continuously computing the solution for an airborne vehicle using only onboard sensors, information, and systems.

The effect of the invention can be realized today using the following process and systems. Under manual control, a terrain feature on a map is selected, then the operator determines the location of the terrain feature, then the actual terrain feature is detected using an onboard RADAR, then a processor computes the expected location of the terrain feature based on the current navigation solution, then processes the difference between the expected location and the relative location as determined by the RADAR in order to compute the navigation error in the current navigation solution. A processor then updates the onboard navigation system in order to minimize the computed navigation error.

In another example, the effect of the invention can be realized today using the following process and systems. Terrain photos are taken using an onboard camera, then a processor determines the expected position and orientation of digital terrain photos (stored onboard) based on the current navigation solution, then a processor computes the difference between the expected position and orientation of the stored terrain photo and the terrain photo acquired by the camera, then computes the navigation error in the current navigation solution, then a processor updates the onboard navigation system in order to minimize the computed navigation error.

A primary object of the present invention is to provide an accurate and precise navigation solution for airborne vehicles using only on board sensors.

Another object of the present invention is to provide an accurate and precise navigation solution for ground vehicles using only on board sensors.

Another object of the present invention is to provide an accurate and precise navigation solution for space vehicles using only on board sensors.

Another object of the present invention is to provide an accurate and precise navigation solution for surface vessels using only on board sensors.

Another object of the present invention is to provide an accurate and precise navigation solution for underwater vessels using only on board sensors.

Another object of the present invention is to provide an accurate and precise navigation solution for vehicles and vessels using multiple sensors and multiple navigation aids.

Yet another object of the present invention is to provide an all weather, low cost, autonomous and day/night navigation solution.

A primary advantage of the present invention is that it provides a higher accuracy and more precise measurements than those using a RADAR altimeter.

Another advantage of the present invention is that it provides a higher accuracy and more precise measurements than those using satellite-based navigation aids.

Another advantage of the present invention is that it provides a higher accuracy and more precise measurements than those using ground-based navigation aids.

Another advantage of the present invention is that it provides bearings to terrain features.

Another advantage of the present invention is that it is not subject to inertial drift problems due to availability of onboard mapped terrain databases.

Another advantage of the present invention is that it provides a higher accuracy and more precise measurements in all weather conditions and all lighting conditions.

Yet another advantage of the present invention is that it is light weight and inexpensive relative to present prior art systems.

Another advantage of the present invention is that it is jam resistant and virtually impossible to spoof.

Another advantage of the present invention is that it is more difficult to detect than present prior art systems.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS BEST MODES FOR CARRYING OUT THE INVENTION

Figure 1:
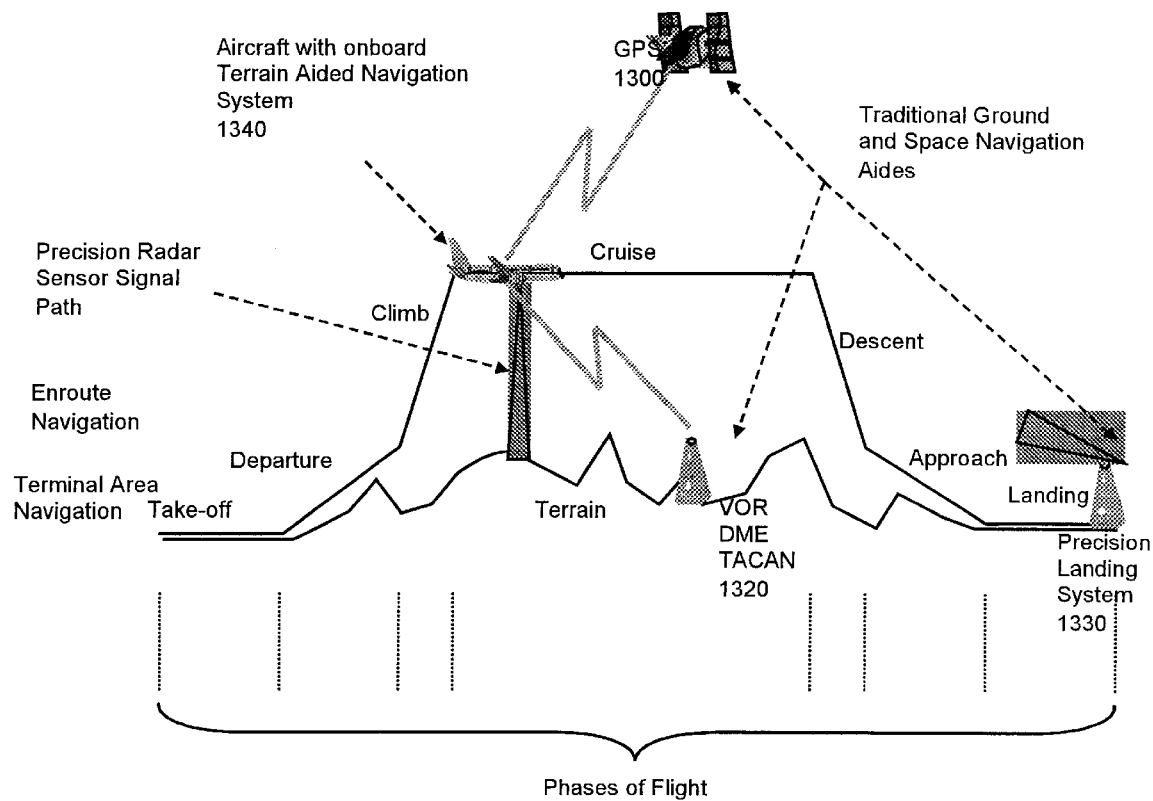
FIG. 1 is a depiction of the relationship between the air vehicle, ground and space based navigation aids, e.g. VOR, ILS, GPS, etc., and the invention.

FIG. 1 is a diagram of a typically application of this invention in an aircraft. Also shown in FIG. 1 are the ground 1320 and 1330 and space 1300 based navigation aides that can augment or be replaced by this invention. As well as showing a typical application of the invention, FIG. 1 also illustrates the self-contained nature 1340 of this invention.

Figure 2:
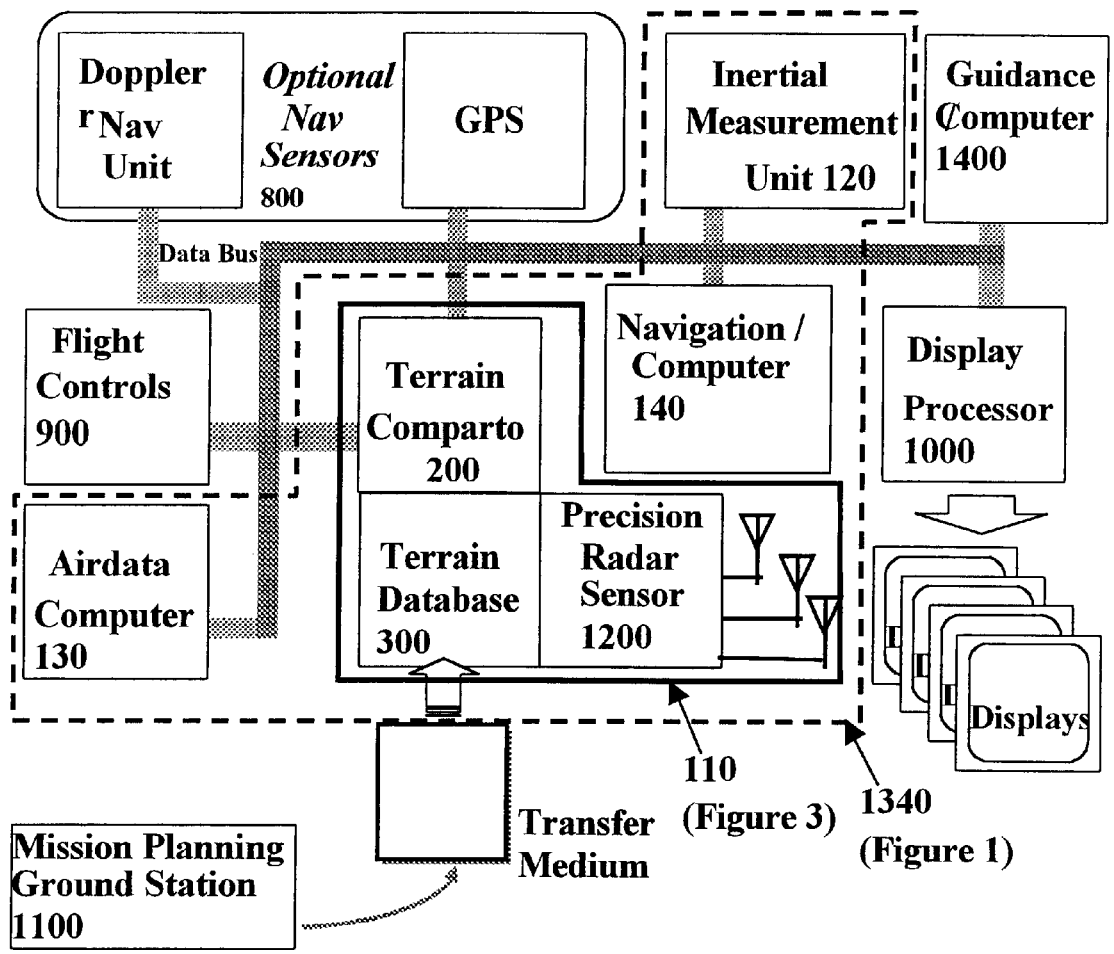
FIG. 2 is a block diagram showing the preferred navigation system and its relationship with other systems.

FIG. 2 is a diagram that shows the one method in which the Precison Radar Sensor 1200 and Terrain Comparator 200 (and its associated Terrain Database 300) are integrated with other systems to provide guidance and control of an air vehicle. In this instance the output of the Terrain Comparator 200 is combined with outputs from an Airdata Computer 130, Inertial Measurement Unit 120 and any optional Navigation Sensors 800 in a Navigation Computer 140. The Guidance computer 1400 will then provide control and display data to the Flight Controls 900 and Display Processor 1000. FIG. 2 also shows the relationship between the Terrain Database 300 and a ground based Mission Planning Ground Station 1100. The Mission Planning Ground Station 1100 is used to tailor the contents Terrain Database 300 to the specific mission of the air vehicle and capabilities of the computation platform that hosts the Terrain Database 300.

Figure 3:
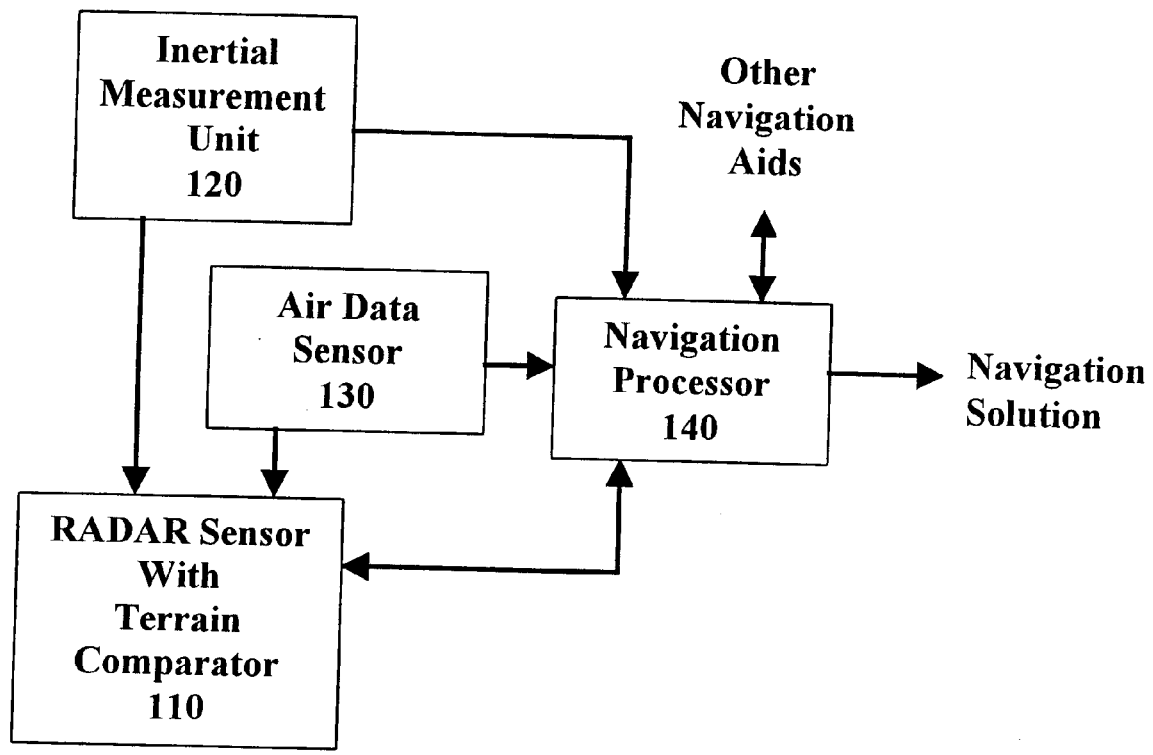
FIG. 3 is a block diagram showing the preferred navigation system.

In accordance with one aspect of the present invention, a navigation system 100, shown in FIG. 3, comprises a RADAR sensor with terrain comparator 110, an inertial navigation sensor 120, an optional air data sensor 130, and a navigation processor 140. The RADAR sensor with terrain comparator 110 produces a position signal and a track quality signal. The inertial measurement unit 120 produces acceleration signals for three orthogonal axes, and angular rate signals for three orthogonal axes. The air data sensor 130 produces velocity signals, altitude signals, and temperature signals. The navigation processor 140 produces a navigation solution comprised of position, velocity, altitude, and attitude based on the signals from the sensors of the navigation system 100 and Other Navigation Aids. Other Navigation Aids can include satellite-based navigation systems like the Global Positioning System (GPS), scene comparators, Doppler velocimeters, and RADAR altimeters.

Use of a position signal and track quality signal from a RADAR sensor with terrain comparator 110 is referred to as terrain aiding, where computation of a navigation solution is aided by consideration of the position signal and track quality signal. One benefit of terrain aiding for the navigation system 100 is a more precise and more accurate navigation solution when compared to present systems. Another benefit is that the navigation solution can be updated continuously (many times per second) using the continuous (many times per second) output from the RADAR sensor with terrain comparator 110. Other benefits will become obvious to those skilled in the art, and are discussed elsewhere herein.

Figure 4:
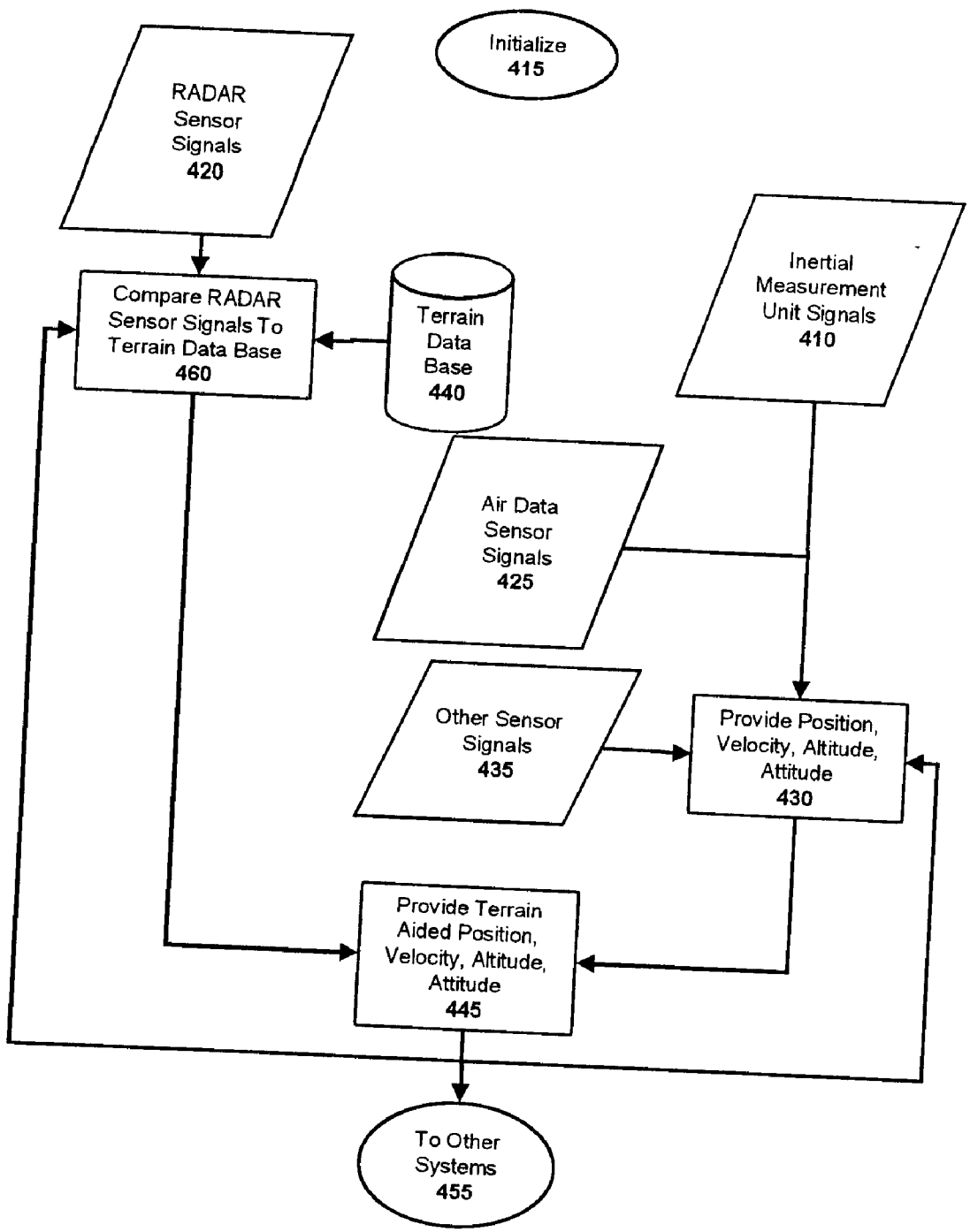
FIG. 4 is a flow chart showing the preferred method of providing a navigational solution.

In accordance with another aspect of the present invention, a method of producing a navigation solution is shown in FIG. 4. Initialize 415 initializes the functions of the navigation system with last known data, seed data, and mission specific data including last known heading and position. Compare RADAR Sensor Signals to Terrain Data Base 460 correlates RADAR Sensor Signals 420 with a Terrain Data Base 440. Provide Position, Velocity, Altitude, and Attitude 430 provides a position, velocity, altitude, and attitude based upon Inertial Measurement Unit Signals 410, Air Data Sensor Signals 425 (optional), and Other Sensor Signals 435 (optional). Provide Terrain Aided Position, Velocity, Altitude, and Attitude 445 provides a position, velocity, altitude, and attitude to Other Systems 455 based upon the output from Provide Position, Velocity, Altitude, and Attitude 430 and the output from Compare RADAR Sensor Signals To Terrain Data Base 460. The output from Provide Terrain Aided Position, Velocity, Altitude, and Attitude 445 also provides feedback to other functions including Compare RADAR Sensor Signals To Terrain Data Base 460 and Provide Position, Velocity, Altitude, and Attitude 430.

Mission management systems and methods provide air vehicles and other vehicles with vehicle navigation, guidance, collision avoidance, terrain following, landing, and/or autonomous control. The present invention improves mission management systems and methods because it is based on the RADAR sensor with terrain comparator 110. The RADAR sensor with terrain comparator 110 is more accurate than state of the art systems that perform scene comparisons and/or are based on external navigation aids like satellite-based navigation systems. Therefore the output from Provide Terrain Aided Position, Velocity, Altitude, and Attitude 445 is more precise than state of the art methods and more accurate than state of the art methods because it is based in part on the output from a novel RADAR sensor with terrain comparator 110. In addition, because the present invention is based on the RADAR sensor with terrain comparator 110, the present invention is capable of operation at lower altitudes than state of the art systems. Because the present invention is based on the RADAR sensor with terrain comparator 110, the present invention provides a new form of fault tolerance and redundancy for mission management systems. Because the present invention is based on the RADAR sensor with terrain comparator 110, the present invention provides a new method for providing navigation solutions for mission management systems.

Referring back to FIG. 3, in accordance with another aspect of the present invention, a method of producing a navigation solution comprised of position, velocity, altitude, and attitude is based upon position and track quality produced from a RADAR sensor with terrain comparator 110; accelerations and angular rates produced from an inertial measurement unit 120; and velocity, altitude, temperature produced from an air data sensor 130, and Other Navigation Aids.

The RADAR sensor with terrain comparator 110 transmits a RADAR terrain tracking signal and receives a reflected RADAR terrain tracking signal. The RADAR sensor produces a terrain feature signal in response to the reflected RADAR terrain tracking signal. The terrain comparator 110 compares the terrain feature signal with reference terrain features to produce a position indicating signal and a track quality signal. The frequency of the transmitted RADAR terrain tracking signal provides that the RADAR sensor with terrain comparator 110 operates in all weather conditions, including in the presence of dust, fog, snow, and rain. In addition, it operates in all lighting conditions, for example in the daylight or nighttime. The RADAR sensor is arranged to control power of the transmitted RADAR terrain tracking signal in response to the track quality signal. Control of the transmitted RADAR terrain tracking signal provides the minimal transmitted RADAR terrain tracking signal power necessary for terrain tracking, thereby reducing detectability of the present invention. Detectability of the present invention is further reduced by minimizing the amount of terrain illuminated by the RADAR terrain tracking signal. Alternately, the terrain comparator 110 can be implemented in the navigation processor 140.

The inertial measurement unit 120 senses acceleration along three orthogonal axes and senses angular rates about three orthogonal axes and converts these sensed measurements into acceleration and angular rate signals, respectively.

The air data sensor 130 senses static air temperature, total air temperature, static air pressure, and total air pressure and computes pressure altitude, corrected altitude, mach number, calibrated airspeed, true airspeed, dynamic pressure, and altitude rate of change.

The navigation processor 140 provides a system time signal to the sensors in order to synchronize all data and information in the navigation system 100. The navigation processor 140 executes software that include navigation algorithms with Kalman filter, and navigation system management routines.

The navigation algorithms with Kalman filter blend data and information from the RADAR sensor with terrain comparator 110, the inertial measurement unit 120, air data sensor 130, and Other Navigation Aids, and produce a high precision, high accuracy, three dimensional navigation solution including position, velocity, altitude, and attitude. The navigation algorithms with Kalman filter also produce error and quality estimations and navigation solution status information.

Navigation system management routines control the mode of operation of the navigation system 100 and its sensors, receives inputs from external systems like mission control systems, and provides the navigation solution to external systems like guidance systems and mission control systems.

Modes of operation for the navigation system 100 include on, off, program, test, initialize, reset, transfer align, forced acquisition, forced track, and run.

Other navigation-related equipment, like GPS receiver or a Doppler ground speed sensor, can be used to aid the navigation solution. The present invention may be used with other systems to enhance their capabilities, including ground proximity warning system, traffic collision avoidance system, terrain following system, guidance system, automatic pilot system, route re-planning system, or the like (not shown).

In the preferred embodiment with optional components, inertial sensor such as a Ring LASER inertial measurement sensor with moderate performance (less than 1 nautical mile of drift per hour); a terrain feature sensor such as a RADAR sensor operating at 4.33 GHz and providing range and bearing to terrain features with better than 1 foot of resolution and accuracy within 2 feet and providing a measurement every 12 msec or faster; processor capable of greater than 400 Mflops providing a navigation update every second or faster; memory; terrain data base with data resolution of between 100 meters and 3 meters (or better) using higher resolution data near terminal area or other area of interest; other navigation-related equipment like GPS receiver capable of tracking at least 5 satellites, a ground speed sensor such as a Doppler ground speed sensor, air data sensor with better than 30 feet altitude accuracy and moderate air speed accuracy.

Using the RADAR sensor with terrain comparator to determine relative position to terrain features in order to automatically, autonomously, continuously, and with low probability of detection minimize the error in a navigation solution as determined in part from an inertial measurement sensor and air data sensor. The benefit is that the RADAR sensor with terrain comparator provides an advantage in accuracy and precision over the state of the art by providing higher resolution and more precise and accurate measurements to terrain features than a RADAR altimeter. The RADAR sensor with terrain comparator may be turned off when not necessary and/or desired, and may be turned on and used when necessary and/or desired, saving power and minimizing the probability of detection. Further benefits can be had with addition of ground proximity warning system, traffic collision avoidance system, terrain following system, guidance system, automatic pilot system, route re-planning system, etc.

Several software algorithms are utilized in this invention in order to operate the hardware:

The computing/memory element operating system provides the management of computing and memory devices that host the software elements;

The external interface management algorithms manage the movement of data to and from the interface devices as well as algorithms for time correlation, data interpolation, data and validity checks and comparisons;

The terrain comparator algorithms match the stored terrain feature data with sensed terrain features;

The terrain feature storage and retrieval algorithms manage the movement of terrain feature data between datalink, the data memory (either temporary or permanent) and the terrain comparator algorithms.

The navigation data blending/filtering algorithm blend time consistent inertial, Doppler and/or airdata with position provided by the terrain comparator algorithms.

The RADAR sensor with terrain comparator provides an advantage in accuracy and precision over the state of the art by providing higher resolution and more precise measurements (to terrain features) than an altimeter and by providing bearing to terrain features, which an altimeter can not provide. Light weight, low cost, high precision and accuracy, autonomous of exterior navigational aids, etc. Ground mapping RADAR systems are much more expensive than the RADAR sensor with terrain comparator. The advantages from EGPWS and TCAS options are having an additional update source resulting in added redundancy, improved accuracy, jam resistant and virtually impossible to spoof (difficult to modify large amounts of terrain). The sensor is low power, spread spectrum, low probability of detection and operates in all weather and during the day and night.

The RADAR sensor with terrain comparator includes the capability to be a fault tolerant precision approach and landing guidance sensor. The RADAR sensors three independent antennae and RF receivers together with three independent terrain comparators can fault provide the fault tolerance necessary to be used during the approach and landing phase of the flight (terminal phase of flight) for all types of the air vehicles. This approach eliminates the reliance on ground or space based navigations aides such as Instrument Landing Systems (ILS), Microwave Landing Systems (MLS), Satellite Landing System (SLS) and GPS Landing Systems (GLS). During the takeoff and departure phase of flight (also part of the terminal phase of flight) the RADAR sensor with terrain comparator can provide obstacle awareness as well as high precision position data to maintain guidance along narrow departure corridors.

Feature data could be added to an onboard data base, where the RADAR sensor with terrain comparator would sense features as well as terrain data and correlate sensed features/terrain with onboard data base features/terrain. Other sensors can be added. For example, one could include a GPS receiver, Doppler ground speed sensor, etc. to provide additional inputs to the navigation computation and generally improve accuracy and/or robustness of the computation.

The inertial sensor can be eliminated if the navigation computation is provided initialization information like ground speed, altitude, attitude, and position. The air data sensor can be eliminated if the navigation computation is provided initialization information like altitude. With substantial processing and memory resources, initialization information may not be needed if the inertial sensor and/or air data sensor are eliminated.

Possible applications for the present invention include: precision navigation for aircraft; navigation of a robot or other device over an object using three dimensional data describing the object instead of terrain data, and using a LASER sensor or interferometer instead of a RADAR sensor; in general, the method could be used to perform object recognition, where data describing known objects form the data base to be correlated with instead of terrain data.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method for terrain aided navigation, the method comprising the steps of:
    a) providing a first vehicle state estimation from a navigational computation source;
    b) correlating data from a RADAR sensor with terrain data from an on board source to provide a second vehicle state estimation;
    c) integrating the first vehicle state estimation with the second vehicle state estimation; and
    d) outputting an enhanced vehicle state estimation from the navigational computation source.

2. The method of claim 1 wherein the step of correlating data from a RADAR sensor with terrain data comprises broadcasting a low probability of detection RADAR signal.

3. The method of claim 2 wherein the step of broadcasting a low probability of detection RADAR signal comprises broadcasting a narrow RADAR signal.

4. The method of claim 2 wherein the step of broadcasting a low probability of detection RADAR signal comprises broadcasting a short duration of transmission RADAR signal.

5. The method of claim 2 wherein the step of broadcasting a low probability of detection RADAR signal comprises broadcasting a low power RADAR signal.

6. The method of claim 2 wherein the step of broadcasting a low probability of detection RADAR signal comprises broadcasting a spread spectrum emission RADAR signal.

7. The method of claim 2 wherein the step of broadcasting a low probability of detection RADAR signal comprises broadcasting a frequency hopping RADAR emission signal.

8. The method of claim 2 wherein the step of broadcasting a low probability of detection RADAR signal comprises broadcasting a directed RADAR signal.

9. The method of claim 1 further comprising the step of providing a day/night sensor.

10. The method of claim 1 further comprising the step of providing an all weather sensor.

11. The method of claim 1 wherein the step of correlating data from a RADAR sensor with terrain data comprises measuring a bearing and a range to an object above the terrain.

12. The method of claim 11 wherein the step of measuring a bearing and a range to an object above the terrain comprises computing an altitude of the object above a datum.

13. The method of claim 11 wherein the step of measuring the bearing and range to an object comprises using more than one RADAR sensor.

14. The method of claim 13 wherein the step of using more than one RADAR sensor comprises using one transmitter and more than one receiver.

15. The method of claim 14 wherein the step of using one transmitter and more than one receiver comprises using an interferometer.

16. The method of claim 1 wherein the step of correlating comprises measuring a bearing and range to at least one object with the RADAR sensor and comparing with the on-board terrain data and the first vehicle state estimation.

17. The method of claim 16 wherein the at least one object comprises an object at a highest elevation.

18. The method of claim 1 wherein the step of providing a first vehicle state estimation from a navigational computation source comprises providing a member from the group consisting of satellite based navigation, inertial navigation, ground based navigation, doppler navigation and dead reckoning navigation.

19. The method of claim 1 further comprising continuously repeating steps a) through d).

20. A system for terrain aided navigation comprising:
a RADAR sensor;
an on-board source for providing terrain data;
a navigation computation source comprising a first vehicle state estimation;
a means for correlating data from the RADAR sensor with the terrain data to provide a second vehicle state estimation;
a means for integrating the first vehicle estimation with the second vehicle state estimation; and
an output from the navigation computation source comprising an enhanced vehicle state estimation.

21. The invention of claim 20 wherein said RADAR sensor comprises a low probability of detection RADAR signal.

22. The invention of claim 21 wherein said RADAR sensor comprises a narrow RADAR signal.

23. The invention of claim 21 wherein said RADAR sensor comprises a short duration of transmission RADAR signal.

24. The invention of claim 21 wherein said RADAR sensor comprises a low power RADAR signal.

25. The invention of claim 21 wherein said RADAR sensor comprises a spread spectrum emission RADAR signal.

26. The invention of claim 21 wherein said RADAR sensor comprises a frequency hopping RADAR emission signal.

27. The invention of claim 21 wherein said RADAR sensor comprises a directed RADAR signal.

28. The invention of claim 20 wherein said RADAR sensor comprises a day/night sensor.

29. The invention of claim 20 wherein said RADAR sensor comprises an all weather sensor.

30. The invention of claim 20 wherein said means for correlating data comprises a means for measuring a bearing and a range to an object above the terrain.

31. The invention of claim 30 wherein said means for measuring a bearing and a range to an object above the terrain comprises an apparatus for computing an altitude of the object above a datum.

32. The invention of claim 30 wherein said means for measuring a bearing and a range to an object above the terrain comprises more than one RADAR sensor.

33. The invention of claims 32 wherein said more than one RADAR sensor comprises one transmitter and more than one receiver.

34. The invention of claim 33 wherein said one transmitter and more than one receiver comprises an interferometer.

35. The invention of claim 20 wherein said correlated data comprises a bearing and range to at least one object from said RADAR sensor and comparing with on-board terrain data and the first vehicle state estimation output.

36. The invention of claim 35 wherein said at least one object comprises and object at a highest elevation.

37. The invention of claim 20 wherein said first vehicle state estimation comprises a member from the group consisting of satellite based navigation, inertial navigation, ground based navigation, doppler navigation and dead reckoning navigation.

* * * * *